UNITED STATES PATENT OFFICE.

ALLEN ROGERS, OF BROOKLYN, NEW YORK.

PAINTING PROCESS AND COMPOSITION THEREFOR.

No Drawing.   Application filed March 10, 1924.   Serial No. 698,285.

This invention relates to painting processes and compositions therefor; and it comprises a process of painting and protecting rusty iron and steel, and particularly metal used for oil tanks and the like, wherein the iron if not already rusty is allowed or caused to rust and is treated with a coating composition comprising an emulsified mixture of linseed oil soap, water and an alkaline casein composition and various pigments, these pigments including a certain amount of whiting and of zinc oxid thereby forming a coating composition whereof the rust on the iron forms an integral part; and it further comprises a composition adapted for use in the stated process and comprising linseed oil soap, water, casein (usually brought into solution with sodium silicate), zinc oxid, whiting and such pigments as may be desired; all as more fully hereinafter set forth and as claimed.

Protection of iron and steel against corrosion and rusting is, of course, a great problem, and particularly in the case of tanks, etc., used for gasoline and oils, both mineral oils and fatty oils. Ordinary oil paints, bituminous varnishes, etc., are here inapplicable. Many compositions have been devised and used for protecting iron and steel against corrosion. To a great extent, however, they do not serve the desired purpose, and in any event they are not considered applicable to rusted surfaces; or to oil tanks and the like. It is a well recognized fact that rusting once initiated tends to continue; probably by the institution of a galvanic couple with the unattacked metal. Most of the ordinary types of paint coatings are more or less porous or tend to become so in time and with rust in contact with the iron, access of moisture tends to increase the amount of rust. It is therefore the usual practice in painting iron which is rusty to remove the rust as a preliminary. The iron or steel, for example, is cleaned by sand blasting or scratch brushing as a preliminary to painting. It is considered bad practice to allow any rust whatever to remain on the surface to be painted.

In the preesnt invention I attack the problem of protecting rusty iron against further corrosion by making the rust itself an integral portion of a protective coating. Instead of being a detriment, the rust is an advantage. Iron does not usually rust or corrode in alkaline media and I make my protective composition of an alkaline character. And that it may penetrate rust I use a certain amount of water in the composition; making it an emulsion. I find in practice that it is desirable to use linseed oil, or a similar drying oil, such as tung oil, blown fish oil, etc., as a component of the composition. In the presence of the alkali, as which I usually employ caustic soda, the oil is more or less saponified, forming the corresponding soaps. As another component of the mixture I employ casein brought in solution by a suitable alkaline body; this body being usually commercial silicate of soda or water glass (sodium silicate). And I find that the presence of a certain amount of zinc oxid and of whiting (calcium carbonate) is highly desirable. The whole mixture is a sort of compound emulsion and is applied by painting on the surface to be protected. The emulsion enters and permeates the rust and comes into actual contact with the iron; the rust forming a part of the body of the coating. If the iron is not already rusty, or is insufficiently rusty, it is advantageous to give it a preliminary treatment whereby rust is formed. The metal may be preliminarily brushed with a little acid, a solution of sal-ammoniac, etc.

Compositions of the type of that just described have the great additional advantage that they resist the solvent and disintegrating action of gasoline and of the various mineral oils and fatty oils, and therefore afford a means of protecting oil tanks and like apparatus. The composition is particularly useful in the interior parts of such tanks. Such a composition furthermore gives an excellent base for ordinary oil paints or asphalt compositions so that for outside work, where it is not a question of resisting oil, etc., rusted metal may be coated with such a composition and finally painted in the usual way.

While many other compositions of the general character hereinbefore outlined may be employed for my purposes, I find particularly advantageous a mixture made as follows: I emulsify linseed oil in a caustic soda solution. Good proportions are 3 gallons of raw linseed oil, 1 pound of caustic soda and one-half gallon of water. The soda should be dissolved in the water first, and added to the linseed oil and the mixture vigorously agitated. This produces an emulsion containing linseed oil soaps, as well as unchanged linseed oil. I further dissolve about 4 pounds of commercial casein in about 4 gallons of water containing 1 pound of commercial water glass and mix this with the first solution, stirring intimately to produce good admixture. To the mixture thus produced may be added 18 pounds of whiting and the same quantity of commercial zinc oxid. Four or five pounds of tinting pigments of any desired character may be further added.

The whole composition made as just described is a thick paint-like mass. It may be ground in the usual type of paint mills. If it be desired to store the material for long periods, a small amount of a preservative, such as phenol, salicylic acid, etc., may be added. In spite of its thickness, the composition has a great spreading power on metals and when it is applied to a rusty iron or steel surface, it penetrates the rust, reaching the metal. As it sets, or "dries", the rust becomes an integral part of the coating. With well rusted iron the first coating is ordinarily red in color, the intensity being in proportion to the thickness of the rust. The more rust there is on the surface, the better the protection will be. The mixture is strongly adhesive and clings firmly to the metal. Its adherence, however, to rusted metal is much better than its adherence to clean metal.

As to what chemical reactions ensue in the manufacture and drying of this paint among the described components and between them, or their reaction products and the iron rust, I am not prepared to say. I may note, however, that, as stated, in the dried paint film the oxid of iron, or rust, is a component and it no longer has its usual power of developing further rust on the metal; possibly because it is spaced away from the metal by penetration of liquid therebetween and possibly because the oxid no longer exists in its orginal physical form. The whiting and zinc oxid appear to be highly advantageous bodies in the composition and in the process; perhaps because of reaction with the soap and the casein, as well as the silica, if present, with formation of insoluble compounds. Whatever the reasons may be, on rusty iron and steel the composition forms an unusually hard and resistant non-pervious coating. It is non-porous and does not allow access of water to the underlying metal. The coating is further insoluble in oils, even resisting gasoline. It thus finds its chief application for the coating of oil storage tanks, which, up to the present time, have not been successfully protected against corrosion, and it is for this purpose that the protective properties of this coating find their greatest usefulness.

For outside work and the protection of surfaces exposed to the weather which are to receive asphalt or paint coatings, the new process may be employed in lieu of sand blasting or scratch brushing as a preliminary to such painting. The surface, in lieu of being cleaned to free it of rust, is simply coated with the present composition and thereafter painted in the usual way.

What I claim is:—

1. The process of protecting rusty iron with an oil-proof coating containing iron rust as a component, which comprises coating rusty iron with a firmly adhering composition containing insoluble zinc and calcium compounds, linseed oil soaps and casein to form a coating carrying the rust of the metal as an integral component.

2. The process of protecting iron and steel which comprises rusting the metal and thereafter applying a coating containing insoluble zinc and calcium compounds, linseed oil soaps and casein, to form a coating carrying the rust of the metal as an integral component.

3. The process of protecting rusty iron which comprises applying to rusty iron a composition containing linseed oil soaps, casein, silicate of soda, zinc oxid and whiting; all as an aqueous suspension and solution.

4. The process of protecting the interior of rusty iron or steel tanks used for the storage of gasoline, mineral oils, animal and vegetable oils, etc., by applying to rusted surfaces thereof a composition containing linseed oil soaps, casein, silicate of soda, zinc oxid and whiting; all as an aqueous suspension and solution.

5. As a new composition of matter for protecting rusty iron, a pasty composition of alkaline reaction containing water, zinc and calcium compounds, linseed oil soaps, silicate of soda and casein.

In testimony whereof, I have hereunto affixed my signature.

ALLEN ROGERS.